R. S. MERRILL.

Lamp.

No. 3,315. Reissued March 2, 1869.

Witnesses:
S. B. Crosby
W. B. Gleason

Inventor:
Rufus S. Merrill

N. PETERS, Photo-Lithographer, Washington, D. C.

UNITED STATES PATENT OFFICE.

RUFUS S. MERRILL, OF IRASBURG, VERMONT.

IMPROVEMENT IN LAMPS.

Specification forming part of Letters Patent No. 24,397, dated June 14, 1859; Reissue No. 3,315, dated March 2, 1869.

*To all whom it may concern:*

Be it known that I, RUFUS S. MERRILL, late of Lynn, in the county of Essex, in the State of Massachusetts, but now of Irasburg, in the county of Orleans and State of Vermont, have invented a new and useful Improvement in Burners for Hydrocarbon Fluids; and I do hereby declare that the following, taken in connection with the drawings which accompany and form part of this specification, is a description thereof so full and exact as to enable those skilled in the art to practice my invention.

Figure 1:
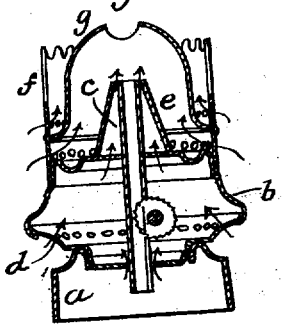
Figure 2:
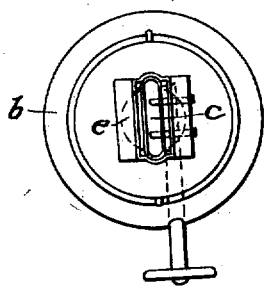
Figure 3:
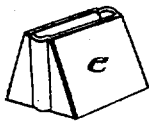

Figure 1 is a sectional elevation, and Fig. 2 a plan illustrating my invention. Fig. 3 is a perspective view of the part I add, in the manner or under the arrangement hereinafter described, to burners now in common use whereby their efficiency is greatly increased.

The nature of my invention consists, first, in the means I employ or the equivalents thereof by which the atmospheric air, whether free from or mingled with vapors arising from the fluid burned in the lamp, is directed so as to impinge upon the flame in the manner herein shown and described; second, in the means described for securing the director or jacket to the wick-tube.

Referring to the drawings, *a* is the metallic cap whereby the burner may be fixed upon a lamp-body. The chamber *b*, which is screwed into the cap *a*, supports the wick-tube *c*. Openings may be left by the sides of the wick-tube where it passes through the top and bottom of said chamber, through which openings any vapor formed in the body of the lamp can escape. Holes are formed in the chamber *b* at *d*, which admit the air within said chamber to mingle with the vapor issuing from the lamp-body or oil-vessel through the openings at the sides of the wick-tube. In the top of the chamber *b* are provided larger openings than those in the bottom to permit the free passage of the mingled air and vapor into the director or jacket *e*, which is made of thin sheet metal with inclined sides. To secure this director to the burner in its proper relation to the wick-tube and other parts composing the burner, yet so as to allow of its removal for cleaning purposes, the sides corresponding to the convex ends of the wick-tube may be made to conform with the wick-tube—that is, by forming channels or grooves in the vertical ends fitting the semi-cylindrical ends of the wick-tube. The sides of the director or jacket *e* expand or flare toward its bottom to cover the openings formed in the top of the chamber *b*, and taper upward toward the end of the wick-tube, leaving between the upper edges of it and the director *e* two long and narrow apertures or slits through which the mingled air and vapor are projected upon the flame to urge and support combustion. This mingled current in its passage is heated, which induces its upward movement and adapts it better to support combustion, while the inclined sides of the director *e* cause it to impinge directly upon the flame.

The object in view in constructing the sides of the director to fit and slide on the cylindrical edges of the tube *c* is to afford a ready means for detaching it from the rest of the burner so as to free it and the wick-tube from incrustations and to insure on being replaced its proper adjustment in relation to the wick-tube.

The burner shown in the accompanying drawing is constructed with a deflector, *g*, held in a cylindrical casing, *f*, which surrounds the chamber *b*. This casing has for its object to hold the glass chimney and to admit atmospheric air under the deflector, or both under and over the deflector, for which purpose apertures or openings *m* are provided under the deflector, and other apertures are or may be made immediately above the deflector. The air entering from without, under the deflector, will be, by means of the jacket or director, conducted to the flame in two converging planes, striking or impinging upon the flame at a point somewhat above the wick-tube. This arrangement I deem essential to the perfect operation of the burner.

In conclusion, I would observe that I have described to the best of my knowledge the principle of operation of my improvement, yet I have my doubts as to whether the useful effect produced by the addition of the jacket to the wick-tube is due to the direction given to the outer air (see arrows *m*) so as to cause it to impinge on the flame at a point remote from the upper end of the wick-tube—*i.e.*, above the blue part of the flame—or whether it is due to the direction given to and to the heating of the air mingled with vapor, (see arrows

*n*,) or whether it is due to both. However that may be, my invention will be understood to consist in surrounding the wick-tube with a jacket, such as hereinbefore described.

Having described my said invention, what I claim, and desire to secure by Letters Patent, is—

1. The combination, with the wick-tube and deflector of a hydrocarbon-fluid burner, of a jacket with sides contracted or tapering toward the upper end of the wick-tube, together with apertures in or such arrangement of the burner whereby the air outside of the jacket may be properly directed to impinge upon the flame, as set forth.

2. The combination, with a hydrocarbon-fluid burner, of a wick-tube surrounding jacket of conical or equivalent form under an arrangement substantially as described, so that the vapor from within the vessel and the air from without may be directed to impinge upon the flame, substantially as and for the purposes set forth.

3. In hydrocarbon-fluid burners of otherwise ordinary construction, the combination, with a flat wick tube, of a director or jacket constructed as described, so as to allow of its ready adjustment to and removal from its base, substantially in the manner and for the purposes set forth.

In testimony whereof I have signed my name to this specification before two subscribing witnesses.

Witnesses: RUFUS S. MERRILL.
W. D. TYLER,
H. H. BAILEY.